(12) United States Patent
Allen et al.

(10) Patent No.: US 8,020,151 B2
(45) Date of Patent: Sep. 13, 2011

(54) TECHNIQUES FOR DETERMINING A WEB BROWSER STATE DURING WEB PAGE TESTING

(75) Inventors: Joel B. Allen, Mebane, NC (US); Joshua D. Ghiloni, Durham, NC (US); Wes D. Hayutin, Raleigh, NC (US); Howard S. Krovetz, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/831,152

(22) Filed: Jul. 31, 2007

(65) Prior Publication Data

US 2009/0037882 A1    Feb. 5, 2009

(51) Int. Cl.
G06F 9/44 (2006.01)
G06F 9/45 (2006.01)

(52) U.S. Cl. .............. 717/125; 717/109; 714/46

(58) Field of Classification Search .......... 717/123–128, 717/109–110; 714/46, 56–57
See application file for complete search history.

(56) References Cited

U.S. PATENT DOCUMENTS

| | | | | |
|---|---|---|---|---|
| 5,799,603 A * | 9/1998 | Tellington | ...................... | 114/261 |
| 6,442,714 B1 * | 8/2002 | Griffin et al. | ................... | 714/46 |
| 6,526,566 B1 * | 2/2003 | Austin | ......................... | 717/109 |
| 6,708,327 B1 * | 3/2004 | Aliphas | ....................... | 717/125 |
| 6,775,824 B1 * | 8/2004 | Osborne et al. | ............... | 717/125 |
| 6,802,053 B1 * | 10/2004 | Dye et al. | ..................... | 717/113 |
| 6,807,506 B2 * | 10/2004 | Sutton et al. | ................. | 702/123 |
| 6,810,494 B2 * | 10/2004 | Weinberg et al. | ............... | 714/46 |
| 6,895,551 B1 * | 5/2005 | Huang et al. | ................... | 715/205 |
| 6,934,934 B1 * | 8/2005 | Osborne et al. | .............. | 717/126 |
| 7,000,224 B1 * | 2/2006 | Osborne et al. | ............... | 717/125 |
| 7,055,137 B2 * | 5/2006 | Mathews | ...................... | 717/125 |
| 7,171,652 B2 * | 1/2007 | Motoyama et al. | ........... | 717/123 |
| 7,287,230 B2 * | 10/2007 | Austin et al. | ................... | 715/763 |
| 7,389,495 B2 * | 6/2008 | Wang et al. | ................... | 717/126 |
| 7,407,108 B1 * | 8/2008 | Euler et al. | .............. | 235/472.01 |
| 7,437,715 B2 * | 10/2008 | Chatsinchai et al. | ......... | 717/127 |
| 7,600,014 B2 * | 10/2009 | Russell et al. | ................ | 709/224 |
| 7,653,896 B2 * | 1/2010 | Herdeg, III | .................. | 717/113 |
| 7,665,068 B2 * | 2/2010 | Neumann et al. | ............. | 717/125 |
| 7,827,527 B1 * | 11/2010 | Chiluvuri | ...................... | 717/109 |
| 7,840,851 B2 * | 11/2010 | Hayutin | .......................... | 714/46 |
| 7,844,911 B2 * | 11/2010 | Austin et al. | .................. | 715/763 |
| 7,849,447 B1 * | 12/2010 | Karis et al. | ..................... | 717/125 |
| 7,873,946 B2 * | 1/2011 | Lathrop et al. | ................ | 717/125 |

OTHER PUBLICATIONS

Vieira et al, "Automation of GUI testing using a model driven approach", ACM AST, pp. 9-14, 2006.*

(Continued)

Primary Examiner — Anil Khatri
(74) Attorney, Agent, or Firm — Dillon & Yudell LLP

(57) ABSTRACT

A technique for determining a browser state during a web page test includes providing, from a test automation tool, a first input to a web page provided via a browser. The technique also includes detecting, with a network monitoring tool, outgoing traffic from the browser associated with the first input and detecting, with the network monitoring tool, incoming traffic to the browser associated with a response to the first input. An indication is provided from the network monitoring tool to the test automation tool when the incoming traffic is detected by the network monitoring tool. Finally, the test automation tool provides a second input to the web page following the indication.

4 Claims, 2 Drawing Sheets

OTHER PUBLICATIONS

Sun et al, "Specification driven automated testing of GUI based Java programs", ACM ACMSE, pp. 140-145, 2004.*
Nguyen et al, "Model based testing of multiple GUI variants using the GUI test generator", ACM AST, pp. 24-30, 2010.*
Mesbah et al, "Invariant based automatic testing of AJAX user interface", IEEE, pp. 210-220, 2009.*
Xie et al, "Desigining and comparing automated test oracles for GUI based software applications", ACM Trans. Software Eng. and Methodology, vol. 16, No. 1, article 4, pp. 1-36, 2007.*
Sztipanovits et al, "The automated web application testing (AWAT) system", ACM SE, pp. 88-93, 2008.*

* cited by examiner

TECHNIQUES FOR DETERMINING A WEB BROWSER STATE DURING WEB PAGE TESTING

BACKGROUND

1. Field

This disclosure relates generally to a web browser and, more specifically to techniques for determining a web browser state.

2. Related Art

A web browser (hereinafter "browser") is a software application that allows a user at a client computer system (hereinafter "client") to display and interact with text, images, and other information located on a web page at a website (hosted by a web application server) on the world wide web or a local area network. Text and images on a web page may contain hyperlinks to other web pages at the same or different website. Browsers allow a user to quickly and easily access information provided on web pages at various websites by traversing hyperlinks. Browsers usually format hypertext markup language (HTML) information for display and, as such, an appearance of a web page may differ between browsers. A number of different browsers, e.g., Internet Explorer, Mozilla Firefox, Safari, Opera, and Netscape, are currently available for personal computers. In general, browsers are the most commonly used type of hypertext transfer protocol (HTTP) user agent. While browsers are typically used to access web application servers (hereinafter "web servers") that are part of the world wide web, browsers can also be used to access information provided by web servers in private networks or content in file systems.

Asynchronous JavaScript™ and extensible markup language (XML) (AJAX) is a web development approach used for creating interactive web applications. AJAX attempts to make web pages more responsive by exchanging reduced amounts of data between a client browser and a web server, such that an entire web page does not usually have to be reloaded each time a user performs an action that requires a change in the web page displayed by the browser. AJAX is intended to increase interactivity, speed, functionality, and usability of a web page. AJAX function calls are made using the JavaScript™ programming language and data retrieved using AJAX is commonly formatted using extensible markup language (XML). AJAX is a cross-platform technology that is usable on many different operating systems (OSs), computer architectures, and browsers as AJAX is based on open standards, e.g., JavaScript™ and XML.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
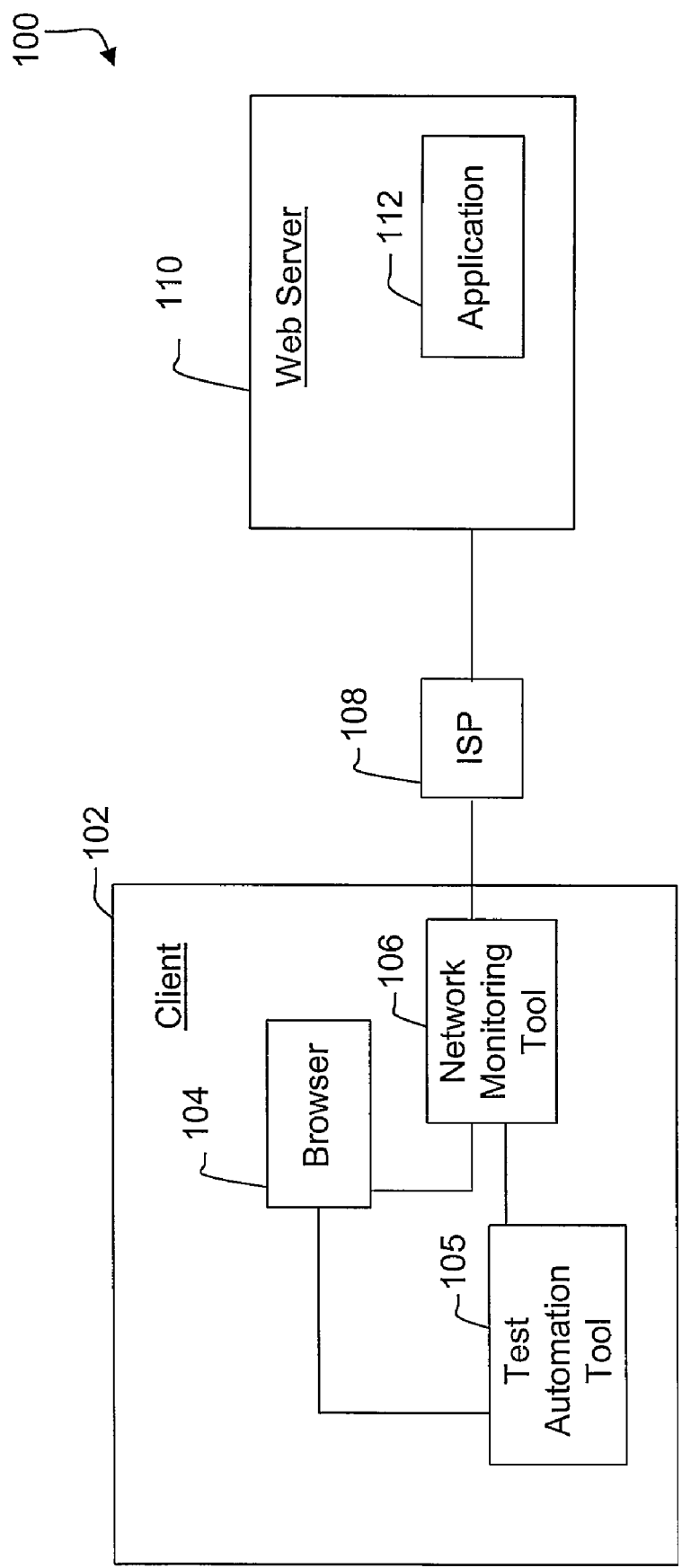
FIG. 1 is a block diagram of an example computer network that may be configured to determine a browser state according to various aspects of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, or communicate the program for use by or in connection with an instruction execution system, apparatus, or device.

Computer program code for carrying out operations of the present invention may be written in an object oriented programming language, such as Java™, Smalltalk, C++, etc. However, the computer program code for carrying out operations of the present invention may also be written in conventional procedural programming languages, such as the "C" programming language or similar programming languages. The program code may execute entirely on a single computer, on multiple computers that may be remote from each other, or as a stand-alone software package. When multiple computers are employed, one computer may be connected to another computer through a local area network (LAN) or a wide area network (WAN), or the connection may be for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Currently, graphical user interface (GUI) test automation tools that need to accurately determine a state (e.g., a ready state) of a browser may not function properly with web applications that employ JavaScript™, e.g., AJAX. This is due, at least in part, to the fact that GUI test automation tools have relied on receiving a browser ready state when testing a web page. In a typical case, a GUI test automation tool tests a web page by exercising objects on the web page and waiting for a browser ready state before moving to a next line of test code. However, with web applications that use JavaScript™, such as AJAX, a browser ready state may not be provided when a web page is updated. While a time-out or sleep call can be made following a request to a web server to update a web page, web servers vary greatly in the amount of time required to render a web page. For example, one web server may render a page in seconds, while another web server may render a web page in minutes.

Various embodiments of the present disclosure are generally directed to employing network monitoring techniques to facilitate browser ready state determinations for JavaScript™ web applications, e.g., AJAX, that may not perform a full web page refresh each time a portion of a web page is updated. As noted above, AJAX web applications may not work properly with current graphical user interface (GUI) test automation tools, due to the fact that AJAX web applications may not perform a conventional full page refresh when a web page changes. Due to volume of web applications, e.g., WebSphere®. Portal, that are moving to an AJAX framework, it is increasingly desirable to ensure that GUI test automation tools function correctly with JavaScript™ applications, such as AJAX applications. For current GUI test automation tools to work effectively, the GUI test automation tools need to be able to correctly ascertain a browser state.

According to one aspect of the present disclosure, a technique for determining a browser state during a web page test includes providing, from a test automation tool, a first input to a web page that is provided via a browser. The technique also includes detecting, with a network monitoring tool, outgoing traffic from the browser associated with the first input and detecting, with the network monitoring tool, incoming traffic to the browser associated with a response to the first input. An indication is provided to the test automation tool when the incoming traffic is detected by the network monitoring tool. Finally, the test automation tool provides a second input to the web page following the indication.

According to another aspect of the present disclosure, a technique for determining a browser state during a web page test includes providing, from a test automation tool, a first input to a web page, which is provided via a browser. The technique detects, with a network monitoring tool, incoming traffic to the browser. In this case, the incoming traffic corresponds to a response to outgoing traffic from the browser which is associated with the first input. An indication is provided to the test automation tool based on the incoming traffic. The test automation tool provides a second input to the web page in response to the indication.

Traditionally, a GUI test automation tool has exercised an object (by "clicking" a link or button, setting text, etc.) and then waited for the browser ready state (Http ready state) before moving on to a next line of program code. For example, a GUI test automation tool may perform a click on a logout button (LogoutButton( ).click( )), wait for a browser ready state (Http ready state), and then click on an OK button (OKButton( ).click( )). It should be appreciated that if the wait for a browser ready state is removed, a GUI test automation tool may attempt to click the OK button before the web page is done rendering, which may cause the GUI test automation tool to operate in an erratic and unreliable manner. As noted above, while time-outs and sleep calls can be implemented, employing time-outs and sleep calls is rigid and generally unreliable, due to the wide variation in which web servers may render a web page. Moreover, it may be necessary to determine what is to be rendered next when using sleep or time-out methods.

One of the more powerful features of AJAX is that less information is required to be transferred between a web server and a client browser, as only information that changes needs to be provided from the web server to the browser. In general, this speeds up web page updates. However, with AJAX, the Http ready state and the XMLHttp ready state are two separate entities. In general, AJAX only updates portions of the browser and infrequently requires a full page refresh (which is what GUI test automation tools have traditionally keyed on for the browser ready state). In JavaScript™ web applications, such as AJAX, browser operations change based on an XMLHttpRequest object. In general, XMLHttpRequests can put a browser in one of the following five states: uninitialized, open( ) has not yet been called; loading, send( ) has not yet been called; loaded, send( ) has been called, and headers and status are available; interactive, partial data has been downloaded; and completed or finished with all operations. In general, the browser is always in a ready state (from the standpoint of a conventional GUI test automation tool) when the JavaScript™ XMLHttpRequest object is used. In general, current GUI test automation tools do not support reading the browser ready state (XMLHttp ready state) from JavaScript™. For example, Rational®. Functional Tester, SilkTest by Borland, as well as other currently available commercial tools do not offer support for browser ready states when using JavaScript™ applications, e.g., AJAX applications.

The present disclosure is generally directed to a number of different techniques for detecting a browser ready state for JavaScript™ applications, e.g., AJAX applications, using network monitoring techniques. In general, the techniques use a tool to detect transmission control protocol/Internet protocol (TCP/IP) communication between a client browser and a client server or a web server. As one example, the TCP Tunnel tool (available from Sureshot Software, a division of Bysoft Data AB), which functions as a proxy between a client browser and a web server, may be employed to detect communication between a client browser and a web server. In a typical application, the TCP Tunnel tool is started and configured to listen on a local port and forward all requests on the local port to a web server on a remote port. When the browser is opened it is pointed to a local host at the local port of the TCP Tunnel tool.

The TCP Tunnel tool forwards requests to the web server on the remote port and functions as a proxy between the browser and the web server. In this manner, the TCP Tunnel tool is able to sniff all TCP traffic between the browser and the web server. By inspecting the output of the TCP Tunnel tool, a GUI test automation tool be apprised of what traffic has been transmitted from the web server to the client. In essence, the TCP Tunnel tool wraps a TCP tunnel around the browser using Java™. By wrapping the browser in a tunnel, any TCP browser actions, e.g., standard HttpRequests, XMLHttpRequests, and local XMLHttpRequests to local XML files on a client, may be intercepted. Providing a wrapper around the browser (as contrasted with the network), allows for detecting requests necessary for properly determining a browser ready state for AJAX web applications. The technique also captures any transport data that is one layer below HTTP application traffic on the open systems interconnect (OSI) network model. In any of the disclosed techniques, data can be parsed on the fly or written out to a text file.

An example TCP Tunnel dialog is set forth below:

states. In this case, the detection of an update of a portion of a web page using, for example, an AJAX enabled portlet, may be achieved.

With reference to FIG. 1, an example network 100 that is configured to determine a browser state, according to the present disclosure, is illustrated. As is shown, the network 100 includes a client 102 that communicates with a web server 106, via an Internet service provider (ISP) 108. The client 102 executes a browser 104, a GUI test automation tool 105 and a network monitoring tool 106. As is discussed herein, the network monitoring tool 106 captures incoming and outgoing traffic between the browser 104 and the application 112 of the web server 110 such that a state of the browser 104 can be accurately determined and the GUI test automation tool 105 can function in a correct manner. In this case, the web application 112 is a JavaScript application, such as an AJAX application.

---

TCP Tunnel listening...
Got connection on port 31415 from /127.0.0.1 at Thu Aug 03 16:16:18 EDT 200x
GET /dojo/src/widget/templates/images/Tree/treenode_grid_t.gifHTTP/1.1
Host: localhost:31415
User-Agent: Mozilla/5.0 (X11; U; Linux i686; en-US; rv:1.8.0.4) Gecko/20060628 Fedora/1.5.0.4-1_EL4 (CK-IBM) (CK-IBM)
Firefox/1.5.0.4
Accept: image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: http://localhost:31415/dojo/demos/widget/Mail.html
HTTP/1.1 200 OK
Date: Thu, 03 Aug 200x 20:16:12 GMT
Server: Apache/2.0.53 (Linux/SUSE)
Last-Modified: Tue, 23 May 200x 21:56:15 GMT
ETag: "49c3ec-4a-4147bb01bfdc0"
Accept-Ranges: bytes
Content-Length: 74
Keep-Alive: timeout=15, max=100
Connection: Keep-Alive
Content-Type: image/gif
S,,o®ĵÎ˘k˜ľăH6ÄvZéF-:q³⁄₄ ;GET /dojo/src/widget/templates/images/Tree/treenode_expand_minus.gifHTTP/1.1
Host: localhost:31415

¶3,÷,,ÖŒÖŒŒ⎕c|ě˙¹A;Đâ,,FÞó⎕ 3 ÎNNAü⎕ >>)ÚP½ÔÂÔ$>:ŏ˜c˙ˆj⎕ü Ÿ¾ö⎕, ⎕⎕Z‡8K$øď8 ˋ⎕ ~wà
M- óťŮOa(Öwã7 0äL⎕v⎕ Áåïhaò⎕ Á¤Å—>>ĭë1T÷°ËÃ6ûòÀv=5 ỷ¼{)J/o- ĬzUáŸ¤⎕~øÿr>|8ñ
GET/dojo/demos/widget/Mail/mail.css HTTP/1.1
Host: localhost:31415
User-Agent: Mozilla/5.0 (X11; U; Linux i686; en-US; rv:1.8.0.4) Gecko/20060628 Fedora/1.5.0.4-1_EL4 (CK-IBM) (CK-IBM)
Firefox/1.5.0.4
Accept: text/css,*/*;q=0.1
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: http://localhost:31415/dojo/demos/widget/Mail.html

---

As is illustrated in the above dialog, the TCP Tunnel tool captures information on a browser request to local XML file on a client.

Figure 2:
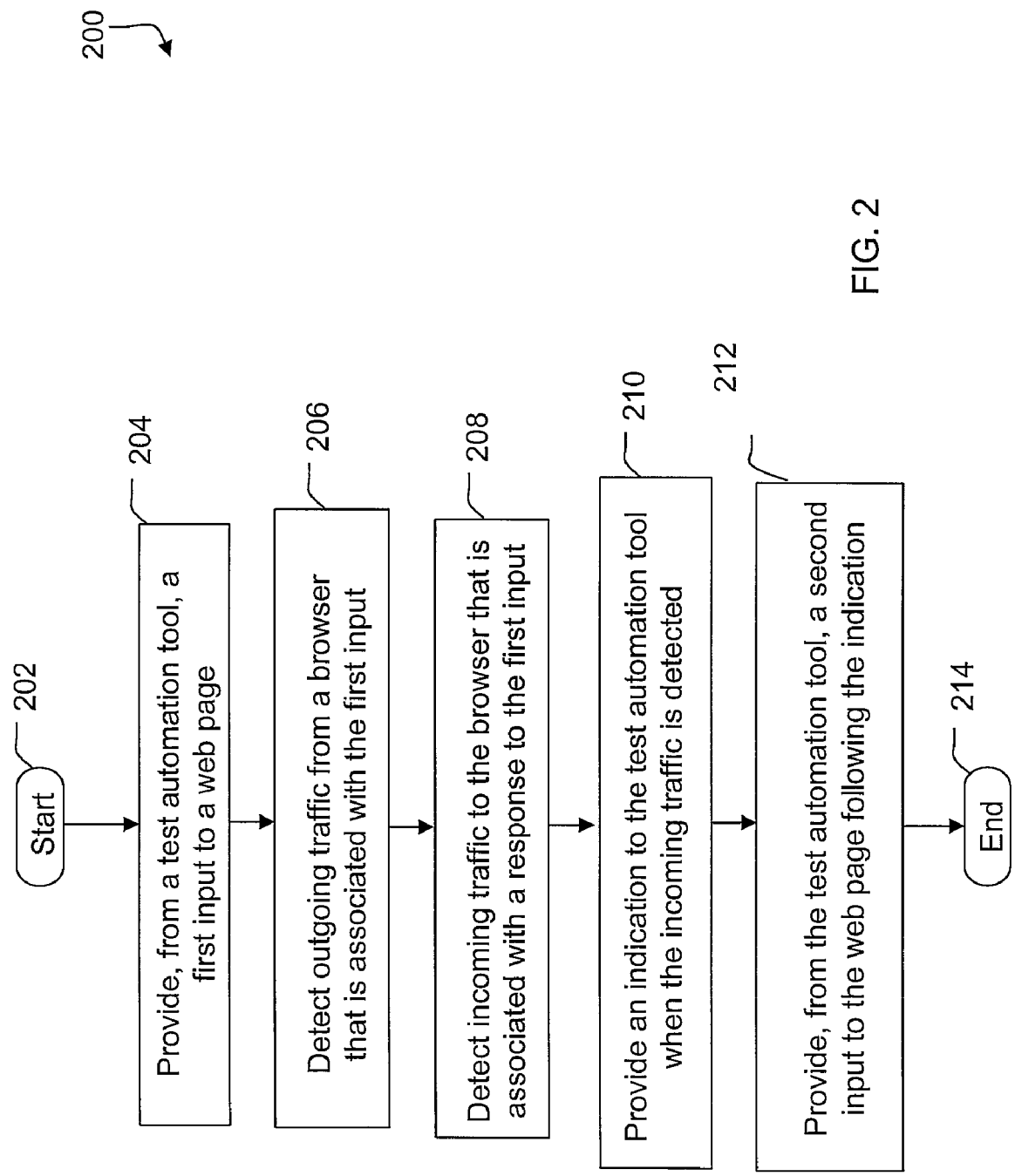
FIG. 2 is a flow chart of a process for determining a browser state according to one embodiment of the present disclosure.

As another example, the Tcpdump tool (which is a network traffic analysis tool originally created by the Network Research Group at Lawrence Berkley National Lab) may be used to track network traffic. In a typical application, the Tcpdump tool is utilized by network administrators to debug network traffic and can display unencrypted network traffic in detail. The Tcpdump tool provides detailed information about the requests from a client to a web server and facilitates parsing output for specific events. While the Tcpdump tool does not generally allow for viewing of XMLHttpRequests to local XML files, when calls are made to a web server the Tcpdump tool facilitates the detection of browser ready Turning to FIG. 2, a process 200 for determining a browser state during a web page test is initiated in block 202, at which point control transfers to block 204. In block 204, the test automation tool 105 provides a first input to a web page that is provided at the client 102 via the browser 104. Next, in block 206, the network monitoring tool 106 is used to detect outgoing traffic (from the browser 104) that is associated with the first input. The outgoing traffic may be directed to the web server 110 or to a local XML file (not shown) at the client 102. Then, in block 208, the network monitoring tool 106 detects incoming traffic (to the browser 104) that is associated with a response (from the web server 110 or the local XML file on the client 102) to the first input. Next, in block 210, an indication is provided to the test automation tool 105 when the incoming traffic is detected by the network monitoring tool 106. It should be appreciated that the network monitoring tool 106 may be configured to directly provide the indication to the test automation tool 105 or the data provided by the network monitoring tool 106 may be parsed by another routine that provides the indication to the test automation tool 105. Then, in block 212, the test automation tool 105 provides a second input to the web page following the indication. Following block 212, the process 200 terminates in block 214.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of determining a browser state during a web page test, comprising:
    providing, from a test automation tool executing on a client, a first input to a web page provided via a browser executing on the client, wherein the first input is derived from a first line of test code for the web page test;
    detecting, with a network monitoring tool executing on the client, outgoing traffic from the browser associated with the first input;
    detecting, with the network monitoring tool, incoming traffic to the browser associated with a response to the first input;
    providing an indication from the network monitoring tool to the test automation tool when the incoming traffic is detected by the network monitoring tool, wherein the indication functions as an indicator of a browser ready state; and
    providing, from the test automation tool, a second input to the web page in response to the indication, wherein the outgoing and incoming traffic correspond to XMLHttpRequest objects and the test automation tool is a graphical user interface test automation tool, and wherein the second input is derived from a second line of the test code; wherein the outgoing and incoming traffic are between the client and local extensible markup file.

2. The method of claim 1, wherein the network monitoring tool is a TCP Tunnel tool or a Tcpdump tool.

3. A method of determining a browser state during a web page test, comprising:
    providing, from a test automation tool executing on a client, a first input to a web page, wherein the web page is provided via a browser executing on the client and the first input is derived from a first line of test code for the web page test;
    detecting, with a network monitoring tool executing on the client, incoming traffic to the browser, wherein the incoming traffic corresponds to a response to outgoing traffic from the browser, and wherein the outgoing traffic is associated with the first input;
    providing an indication from the network monitoring tool to the test automation tool based on the incoming traffic, wherein the indication functions as an indicator of a browser ready state; and
    providing, from the test automation tool, a second input to the web page in response to the indication, wherein the outgoing and incoming traffic correspond to XMLHttpRequest objects and the test automation tool is a graphical user interface test automation tool, and wherein the second input is derived from a second line of the test code; wherein the outgoing and incoming traffic are between the client and local extensible markup file.

4. The method of claim 3, wherein the network monitoring tool is a TCP Tunnel tool or a Tcpdump tool.

* * * * *